United States Patent [19]

Johal et al.

[11] Patent Number: 5,770,323
[45] Date of Patent: Jun. 23, 1998

[54] BEARINGS

[75] Inventors: Charan P. S. Johal, Birstall; David R. Eastham, Hemel Hempstead; Alan D. Pope, Rugby, all of England

[73] Assignee: T & N Technology Limited, England

[21] Appl. No.: 606,275

[22] Filed: Feb. 23, 1996

Related U.S. Application Data

[63] Continuation-in-part of Ser. No. 436,985, May 8, 1995, abandoned, which is a continuation of Ser. No. 87,716, Jul. 12, 1993, abandoned.

[30] Foreign Application Priority Data

Feb. 20, 1991 [GB] United Kingdom ............ 9103481

[51] Int. Cl.$^6$ ............ B32B 15/01; F16C 33/12
[52] U.S. Cl. ............ 428/643; 428/657; 428/681; 428/935; 428/615; 428/645; 428/646; 428/614
[58] Field of Search ............ 428/614, 645, 428/643, 644, 648, 646, 935, 615, 657, 681; 75/232

[56] References Cited

U.S. PATENT DOCUMENTS

| | | | |
|---|---|---|---|
| 2,605,149 | 7/1952 | Schreyer | 428/645 |
| 3,085,876 | 4/1963 | Alexander et al. | 75/232 |
| 3,377,143 | 4/1968 | Alexander | 75/232 |
| 3,644,105 | 2/1972 | Selker et al. | 428/614 |
| 3,658,488 | 4/1972 | Brown et al. | 428/614 |
| 3,922,444 | 11/1975 | Nakamura | 428/627 |
| 4,313,869 | 2/1982 | Littlefield . | |
| 4,334,926 | 6/1982 | Futamura et al. | 75/232 |
| 4,404,263 | 9/1983 | Hodes et al. | 428/614 |
| 4,590,133 | 5/1986 | Lloyd | 428/653 |
| 4,666,786 | 5/1987 | Yano et al. | 428/627 |
| 4,846,940 | 7/1989 | Neuhäuser et al. . | |
| 4,857,267 | 8/1989 | Maki et al. | 419/31 |
| 4,887,772 | 12/1989 | Bergmann et al. | 428/614 |
| 4,892,627 | 1/1990 | Takade . | |
| 4,900,639 | 2/1990 | Hodes et al. | 428/610 |
| 4,916,026 | 4/1990 | Bergmann et al. | 428/614 |
| 5,131,356 | 7/1992 | Sick et al. | 428/614 |
| 5,185,216 | 2/1993 | Tanaka et al. | 428/614 |
| 5,223,347 | 6/1993 | Lhymn et al. | 428/614 |

FOREIGN PATENT DOCUMENTS

| | | |
|---|---|---|
| 0087836 | 11/1987 | European Pat. Off. . |
| 0 207 301 | 6/1988 | European Pat. Off. . |
| 1-255641 | 10/1989 | Japan ............ 428/614 |
| 789987 | 1/1958 | United Kingdom . |
| 1073354 | 5/1964 | United Kingdom . |
| 1 235 100 | 6/1971 | United Kingdom . |
| 1 324 198 | 7/1973 | United Kingdom . |
| 1 406 411 | 9/1975 | United Kingdom . |
| 1 457 419 | 12/1976 | United Kingdom . |
| 2 000 793 | 1/1979 | United Kingdom . |
| 2 020 673 | 11/1979 | United Kingdom . |
| 2187207 | 9/1987 | United Kingdom . |
| 2 217 347 | 10/1989 | United Kingdom . |
| 2 228 743 | 9/1990 | United Kingdom . |
| 2246145 | 1/1992 | United Kingdom . |
| 2 268 502 | 1/1994 | United Kingdom . |
| WO92/08909 | 5/1992 | WIPO . |

OTHER PUBLICATIONS

Merriman, "A Dictionary of Metallurgy", TN 609 M47 C8 1958 pp. 16 (no month).
Abstract No. 83–11006K/05–JP J57207151 Dec. 1982.
Abstract No. 81–48602D/27–JP J56055547 May 1981.
Abstract No. 86–222250/34 J61153255–A Jul. 1986.
Abstract No. 91/016717/07 J02310330–A Dec. 1990.
Handbook of Chemistry & Physics, 52nd edition, QD65 C4, 1971 (no month), pp. B–64 and F–18.

*Primary Examiner*—Ngoc-Yen Nguyen
*Attorney, Agent, or Firm*—Nixon & Vanderhye

[57] ABSTRACT

Bearings are described having composite overlay coatings. The composite overlay coating comprises an electro co-deposited soft metallic matrix having incorporated therein from 0.05 to 2 wt % of a hard metal oxide, said material exhibiting a Vickers hardness (Hv) of from at least 300 to in excess of 600.

4 Claims, 2 Drawing Sheets

BEARINGS

CROSS-REFERENCE TO RELATED APPLICATIONS

This application is a continuation-in-part of Ser. No 08/436,955 filed May 8, 1995, now abandoned, which was a continuation of Ser. No. 08/087,716 filed Jul. 12, 1993, now abandoned.

BACKGROUND OF THE INVENTION

The present invention relates to bearing materials and to bearings using such materials and, particularly to the type of bearing materials generally known as overlay alloys.

Plain bearings for internal combustion engines, for example, generally comprise a strong backing material such as steel which has a layer of a bearing material strongly bonded thereto. The bearing material layer may be any known in the art, but aluminium-based alloys or copper-based alloys are typically used. There are very many different bearing alloys based on aluminium and copper, ranging from relatively soft to relatively hard alloys. Important requirements for bearing alloys are conformability, or the ability of the bearing material to accommodate small misalignments of the shaft journal, and dirt embeddability, or the ability of the bearing material to embed abrasive dirt particles to prevent damage by scoring of the journal. Generally speaking, these two requirements are more characteristic of the relatively softer alloys such as aluminium—20% tin and copper—35% lead, for example. However, these softer alloys which have relatively high contents of a soft, second phase material, are also weaker in fatigue resistance than the harder, less conformable alloys. To produce bearings having adequate conformability and dirt embeddability whilst retaining a high fatigue strength, it is common practice to provide the relatively harder alloys with what is commonly referred to as an overlay. Overlays are generally produced from relatively very soft alloys, usually based on tin or lead and are usually very thin, typically in the range from about 10 to 60 micrometers in thickness. Automotive bearing overlays are typically from about 10 to 30 micrometers in thickness whilst an industrial bearing may have an overlay up to 60 micrometers thick. Although overlay alloys are weak materials per se when tested in "bulk" form, but in the form of a thin coating on a relatively harder bearing material, they often give rise to an increase in the fatigue strength of a bearing. This increase in fatigue strength of the bearing is due to the conformability of the overlay which spreads the applied load over a greater bearing surface area, and prevents localised high loading factors, typically due to misalignment, from causing fatigue. However, even though overlays are able to be used in highly loaded applications, their inherent softness makes them prone to wear by the mating journal surface.

The problem of overlay wear has been exacerbated in recent years by the growing use of cast-iron crankshafts which are inherently more abrasive in nature than the steel shafts which preceded them.

Much work has been carried out to improve the wear resistance of overlay alloys. Lead-tin-copper overlays were developed to improve upon the earlier lead-tin alloys, for example, but even these have resulted in only a relatively small improvement in terms of wear resistance.

DESCRIPTION OF THE INVENTION

It is an object of the present invention to provide a material for a bearing overlay which is more wear resistant than known overlay materials but which retains the desirable characteristics of conformability and dirt embeddability of known overlays.

According to the present invention there is provided a bearing having a composite overlay deposited by electro co-deposition to have a thickness in the range 10 to 60 micrometers, the overlay comprising a soft metal matrix selected from the group consisting of tin-based, lead-based and cadmium-based metals which has dispersed therein a second phase of a hard metal oxide, said oxide having a Vickers hardness (Hv) of at least 300. Materials having Hv values in the range of from 300 to in excess of 600 may be used.

The bearing may comprise a strong backing material such as steel, for example, and have bonded thereto a layer of bearing material on which the overlay is deposited. The bearing material may be any which is known and used in the bearing art.

The overlay matrix comprises tin-based, lead-based or cadmium-based materials including the pure metals, whilst the co-deposited hard particle phase is selected from the group of hard metal oxides including, for example, alumina and zirconia. Alumina is particularly preferred and more preferably $\alpha$-alumina, which has been found to be especially useful.

The hard metal oxide particle phase may constitute from 0.05 up to 2 wt % content of the overlay, but is preferably not more than about 1 wt %. The agglomerated size of said particles is preferably not more than about 5 micrometers and preferably no more than 1 micrometer. The size of individual particles is preferably less than about 1 micrometer. The presence of a small number of agglomerated particles in the size range 5 to 10 micrometers may be tolerated.

Where the overlay is deposited by electro co-deposition, it is preferred that a minimum of 0.1 wt % of the non-metallic hard particle phase is present.

Because the bulk of the overlay consists of the soft metallic phase, the ability to embed dirt particles is not adversely affected.

DESCRIPTION OF THE PREFERRED EMBODIMENTS

EXAMPLE

Figure 1:
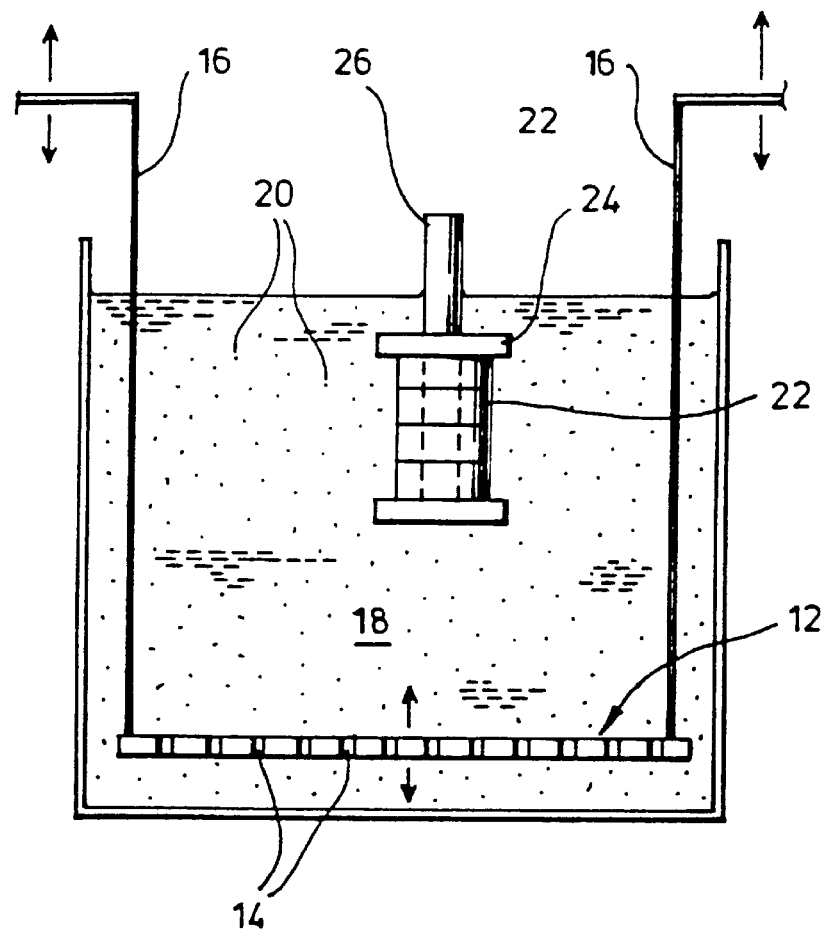
FIG. 1 is a schematic representation of an electro-plating apparatus used to co-deposit overlay coatings according to the invention.

Coventional copper-lead half bearings were used as the substrate onto which overlay coatings were electro co-deposited with various contents of $\alpha$-alumina in a lead-10% tin matrix. The bearings were plated in 8-high stacks in a conventional plating jig. The average particle size of the alumina was less than 1 micrometer. A lead-tin fluoborate solution having the following composition was used for all electro-plating trials;

Lead fluoborate—200 g/l
Stannous fluoborate—20 g/l
Free acid—90 g/l
Resorcinol—6 g/l Various alumina contents were used, the particles being maintained in suspension by a plate pumping technique as schematically represented by the apparatus in FIG. 1. The apparatus comprises a tank 10 having in the bottom thereof a plate 12 with perforations 14. The plate 12 is oscillated up and down on arms 16 driven by electric motor powered cams (not shown). The tank 10 contains the plating solution 18 with particles 20 held in suspension by the pumping action of the plate 12. The bearings to be plated 22 are held in pairs in a jig 24 with a central anode 26. The plated bearing samples had a co-deposited overlay of thickness 18 to 20 micrometers and consisted of a matrix having a composition of lead-10 wt % tin in which were dispersed the varying amounts of a-alumina set out in the Tables below.

The bearings were tested to assess their fatigue strength, wear resistance and corrosion resistance.

Fatigue strength was assessed by testing bearings of 50 mm diameter and 30 mm axial length on a test rig under the following conditions.:

Shaft speed 2800 rev/min;

Initial load 55 MPa;

Load increased after 20 hours at each load by

7 MPa until failure;

Oil temperature 80° C.; and

Sinusoidal load pattern.

Bearings with non-alumina containing overlays of comparable thickness were also tested for the purpose of comparison.

Fatigue resistance of the bearings tested according to the above schedule are given in Table 1 below.

TABLE 1

| Wt % Alumina | Fatigue Load MPa |
|---|---|
| 0.0 | 62, 69, 76 |
| 0.3 | 76, 83 |
| 0.7 | 69 |
| 1.0 | 76 |
| 2.2 | 76 |

These results show that the inclusion of a hard particle phase has no detrimental effect on the fatigue strength of the overlay.

Wear resistance of the deposited overlays was determined by testing at relatively low specific loadings, with wear being assessed by recording weight loss. The programme for each test was:

1 cycle at 48 MPa for 20 hours;

1 cycle at 55 MPa for 20 hours;

5 cyles at 62 MPa, each for 20 hours;

oil temperature 80° C.; and shaft speed 2800 rev/min.

The weight loss was recorded after each cycle.

Figure 2:
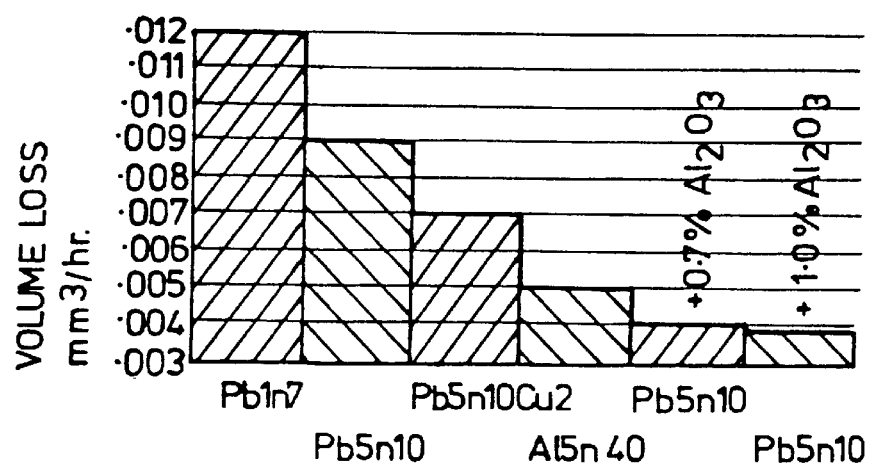
FIG. 2 is a histogram of overlay wear against overlay type.

As may be seen from Table 2 below and from the histogram of FIG. 2, the addition of a co-deposited metal oxide hard particle phase considerably improves the wear resistance of the overlay. An addition of 1 wt % alumina reduces wear of the overlay to approximately one third that of normal lead-10% tin and one half that of lead-10% tin-2% copper which was developed as a more wear resistant overlay. Other overlay examples are also given in FIG. 2. It may also been seen that an addition of 0.7 wt % alumina results in a wear rate less than half that of conventional lead-10% tin.

TABLE 2

| Wt % Alumina | Total Wt Loss After 140 Hours Test (mg) |
|---|---|
| 0.0 | 15 |
| 0.3 | 9.8 |
| 0.5 | 9.0 |
| 0.7 | 8.5 |
| 0.85 | 7.2 |
| 1.0 | 6.0 |

The wear results obtained refer to testing against a hardened steel shaft, and the indications from 3-dimensional surface finish measurements show that there had been a very light polishing of the shaft. Thus, the Ra value has been reduced from 0.32 to 0.20 micrometers, and the peak value (Rp) from 1.02 to 0.73 micrometers. This shows the benefit obtained by the overlay of the present invention in removing imperfections from the journal surface without causing damage thereto.

Figure 3:
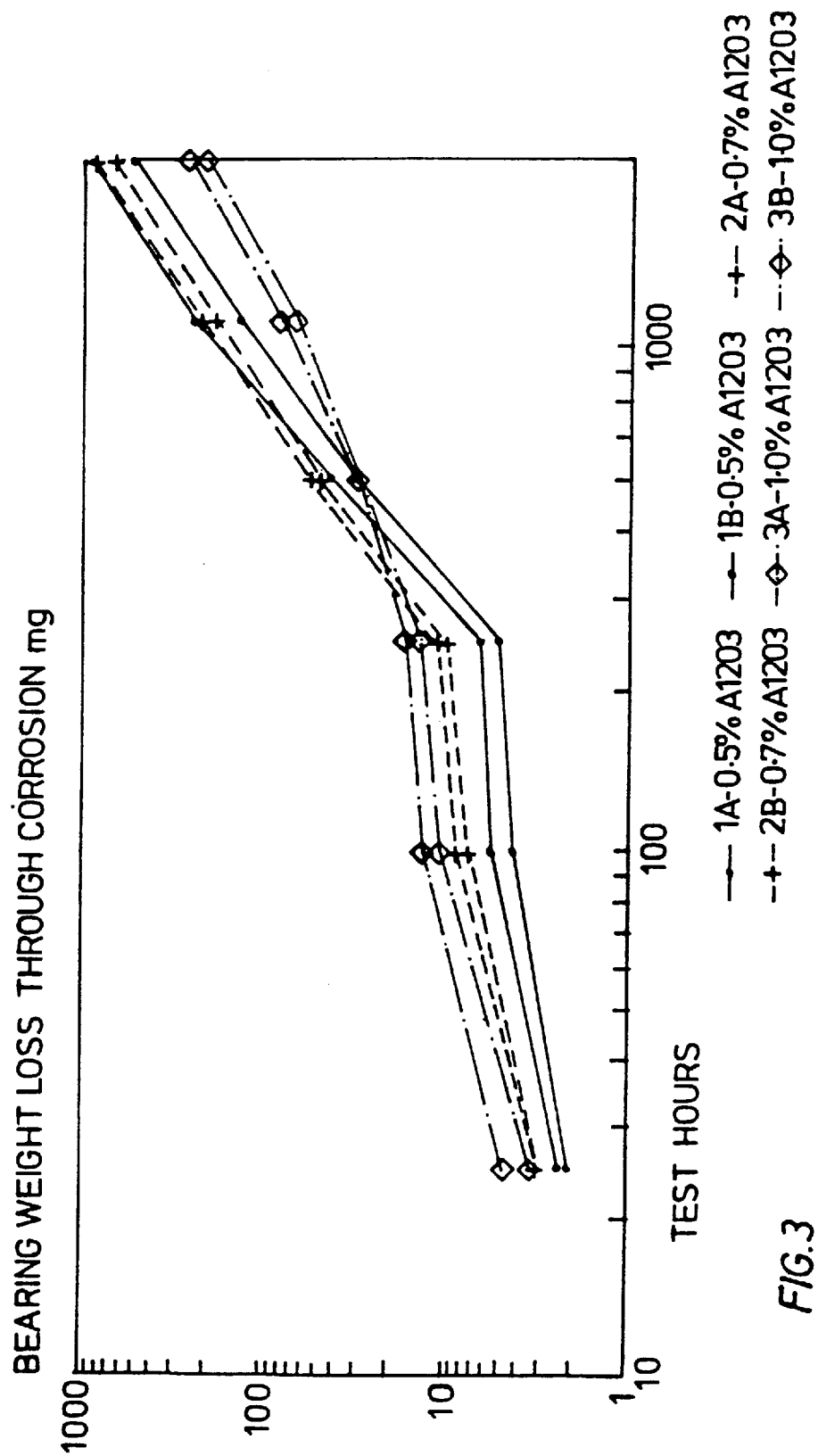
FIG. 3 is a graph depicting corrosion resistance for 3 levels of hard particle content.

The metal oxide hard particle phase has been found to have a virtually neutral effect on the corrosion resistance of lead-10%-tin overlays. FIG. 3 graphically depicts the corrosion resistance of overlays having 0.5, 0.7 and 1.0 wt % alumina, the 'B' samples being repeat tests of the 'A' samples at each alumina level. The corrosion tests were carried out by immersing plated samples in medicinal white oil at 120° C. and recording weight loss at 24, 250, 1000 and 2000 hours. The oil used is very pure having no inhibitors, and degrades rapidly under the test conditions to give very aggressive attack.

We claim:

1. A bearing comprising a steel backing, a bearing alloy layer, and on top of the bearing alloy layer a composite overlay deposited by electro co-deposition to have a thickness in the range 10–60 micrometers and comprising a soft metal matrix selected from the group consisting of tin-based, lead- based and cadmium-based metals, and which has dispersed therein from 0.05 up to 2 wt % of a second phase of α-alumina having a Vickers hardness (Hv) of at least 300, wherein said overlay coating contains sufficient soft metal matrix to embed dirt particles.

2. A bearing according to claim 1 wherein the overlay comprises from 0.05 up to 1 wt % of the α-alumina.

3. A bearing according to claim 2 wherein the overlay comprises from 0.1 to 1 wt % of the α-alumina.

4. A bearing according to claim 1 wherein the agglomerated size of the α-alumina particles is not more than about 5 micrometers, the size of individual particles being less than one micrometer.

\* \* \* \* \*